June 3, 1930.  N. L. CAUSAN  1,761,870
SHOCK ABSORBER
Filed May 3, 1927
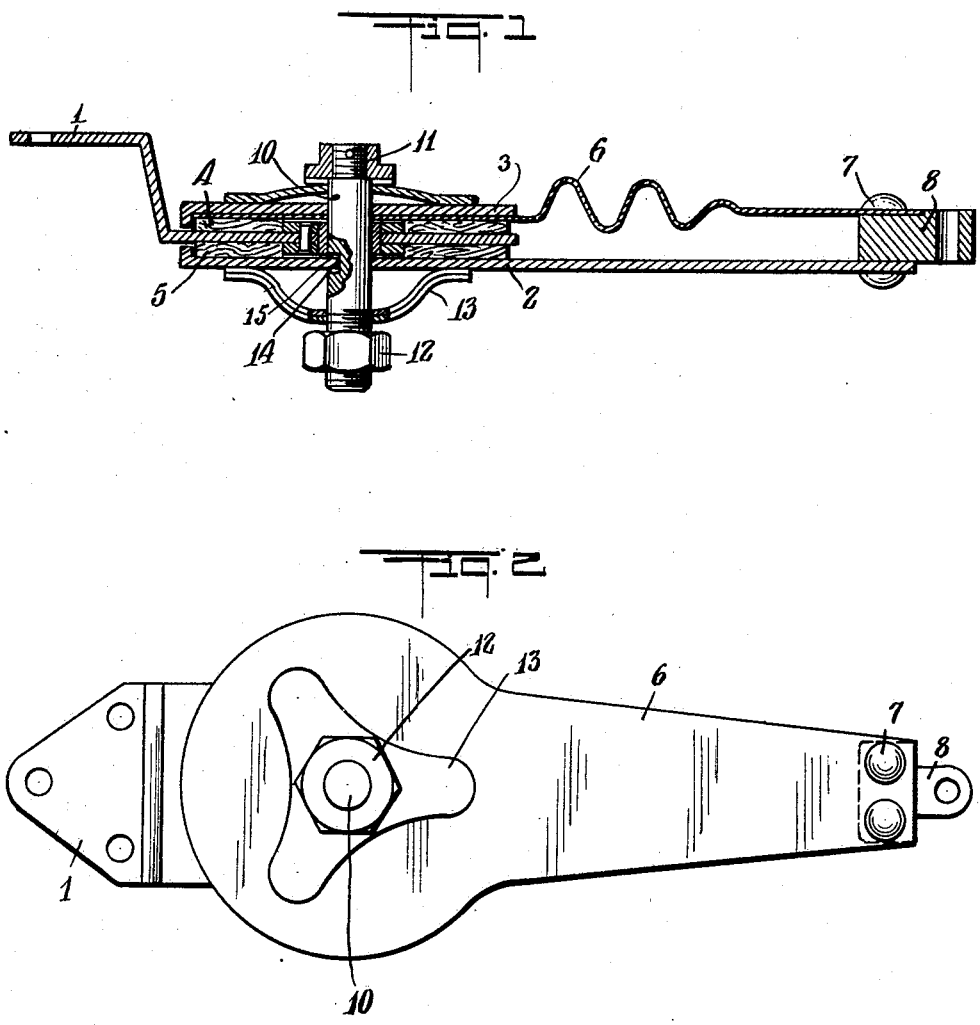
INVENTOR
Nemorin Laurent Causan
BY
ATTORNEY Patented June 3, 1930

1,761,870

UNITED STATES PATENT OFFICE

NÉMORIN LAURENT CAUSAN, OF SURESNES, FRANCE

SHOCK ABSORBER

Application filed May 3, 1927, Serial No. 188,575, and in France May 4, 1926.

The present invention relates to means for suspending automobile vehicles and has for its object the improvement of the means heretofore used for the suspension of such vehicles.

The invention comprises the provision of two friction shock-absorbers substantially parallel to each other, one of which is made somewhat elastic, while the other is of the usual rigid type.

By this construction, the rigid shock-absorber absorbs the shocks imparted to the wheels of the vehicle by small irregularities in pavements while the elastic shock-absorber absorbs great shocks imparted to the vehicle by large ruts, holes, etc., in the roadway.

In order to understand the invention more clearly, reference is to be had to the accompanying drawings, in which like parts are designated by the same reference characters.

Figure 1 is a cross-section of a preferred embodiment of the invention, and

Figure 2 is a plan view thereof.

In the figures, 1 designates a metal plate which is bolted or otherwise suitably secured to the frame of the automobile, and is confined between two metallic plates 2 and 3. Between plate 1 and plates 2 and 3 are inserted friction discs 5 and 4 respectively. These discs are made of wood but, of course, they may be of any other suitable material.

Members 1, 2, 3, 4 and 5 are secured together by means of a bolt 10 provided with two nuts 11 and 12 which may be adjusted so as to regulate the pressure on said members. As an aid in such regulation there is preferably provided a leaf spring 13 of any suitable shape through which the pressure exerted by the nuts 11 and 12 is communicated to the elements 1, 2, 3, 4 and 5.

A key 14 integral with plate 2 engages a key way 15 cut in the bolt 10. Thus the bolt 10 is not permitted to turn and loosen nut 12.

As will be seen in the figures, plates 2 and 3 are substantially parallel to each other, plate 2 being extended so that it may be connected at 7 to the lug 8. An elastic plate 6, having corrugations, is welded to the lower surface of plate 3, the corrugations giving more elasticity to the plate. The plate 6 is also connected at 7 to the lug 8, the lug being provided with an opening so that it may be connected to the axle of the wheels or to the spring of the vehicle.

The plate 2 and plates 3 and 6, being parallel to each other and acting together, dampen all the shocks imparted to the vehicle wheels, the elastic plate 6 dampening the great shocks and the rigid plate dampening the slight shocks.

The shock absorber functions in the following manner: When the vehicle is shocked by bumps in the pavement or roughness on the road, the friction absorber corresponding to arm 2 acts without delay and dampens the vibrations. When the oscillations become more violent the absorber corresponding to plate 6 produces the maximum dampening, the other absorber acting simultaneously and predominating as soon as the violent vibrations cease.

It will be understood that, as shown, the friction torque between 1 and 6 is equal to the friction torque between 1 and 2, but any other ratio between these friction torques may be presented by varying the number of friction discs or their size.

As many changes may be made in the specific construction described without departing from the spirit of the invention, the scope of the invention is to be determined merely by the following claims.

I claim as my invention:

1. In a suspension system for vehicles, the combination of two friction shock absorbers substantially parallel to each other, one absorber having at least one rigid arm and the other absorber having at least one elastic arm.

2. In a friction shock absorber for the suspension of vehicles, means for securing the absorber to the frame of the vehicle, means for securing the absorber to the axle of the vehicle wheels, and at least two arms mounted parallel to each other between said securing means, one of the arms being rigid and the other being elastic.

3. A friction shock absorber for the suspension of vehicles comprising friction discs, two parallel plates engaging said friction discs, means for securing the shock absorber to the frame of the vehicle, and means for securing the shock absorber to the axle of the wheels comprising an elastic extension on one of said plates and a relatively rigid extension on the other of said plates, and means for connecting the ends of said extensions to the axle of the vehicle wheels.

NÉMORIN LAURENT CAUSAN.